(12) United States Patent
Specht et al.

(10) Patent No.: US 11,626,812 B2
(45) Date of Patent: Apr. 11, 2023

(54) CONTROL OF MODULAR MULTILEVEL SERIES/PARALLEL CONVERTERS (MMSPC) BY MEANS OF SWITCHING TABLES AND CONTINUOUS BACKGROUND OPTIMISATION THEREOF

(71) Applicant: DR. ING. H.C.F. PORSCHE AKTIENGESELLSCHAFT, Stuttgart (DE)

(72) Inventors: Eduard Specht, Bruchsal (DE); Stefan Goetz, Forstern (DE); Tomas Kacetl, Pardubice (CZ); Daniel Simon, Ludwigsburg (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 133 days.

(21) Appl. No.: 17/285,498

(22) PCT Filed: May 13, 2019

(86) PCT No.: PCT/EP2019/025146
§ 371 (c)(1),
(2) Date: Apr. 15, 2021

(87) PCT Pub. No.: WO2020/078580
PCT Pub. Date: Apr. 23, 2020

(65) Prior Publication Data
US 2021/0408935 A1    Dec. 30, 2021

(30) Foreign Application Priority Data
Oct. 17, 2018   (DE) ..................... 10 2018 125 728.7

(51) Int. Cl.
*H02M 7/483*        (2007.01)
*H02M 1/084*        (2006.01)
(Continued)

(52) U.S. Cl.
CPC ........... *H02M 7/483* (2013.01); *H02M 1/084* (2013.01); *H02M 7/4833* (2021.05);
(Continued)

(58) Field of Classification Search
CPC .. H02M 7/483; H02M 7/4833; H02M 7/4835; H02M 7/49; H02M 7/53871; H02M 1/084; B60L 15/02; B60L 2210/40
See application file for complete search history.

(56) References Cited

U.S. PATENT DOCUMENTS 6,151,227 A * 11/2000 Mizutani ................. H02M 7/49
                                                                                  363/43
9,502,960 B2    11/2016 Weyh et al.
(Continued)

FOREIGN PATENT DOCUMENTS

DE        10103031 A1    7/2002
DE    102015112512 A1    2/2017
(Continued)

OTHER PUBLICATIONS

Li Zhongxi, et al., "Predictive control of modular multilevel series/parallel converter for battery systems", 2017 IEEE Energy Conversion Congress and Exposition (ECCE), Oct. 2017, pp. 5685-5691, IEEE, Piscataway, New Jersey, USA, XP033247628.
(Continued)

*Primary Examiner* — Gary L Laxton
(74) *Attorney, Agent, or Firm* — Leydig, Voit & Mayer, Ltd.

(57) ABSTRACT

A method controls switching states of a multi-level converter with multiple modules. Each module has: terminals on a first and second side; controllable switches; and an energy store in series with a first switch in a first connection between the terminals. A second switch is arranged in a connection between the terminals. The control of the switch-
(Continued)

ing states is divided into a real-time and offline part. In the real-time part, for each time step: a voltage level is allocated to a voltage requirement; a total switching state is determined in a first switching table for the voltage level; and the total switching state is passed on as a control signal to the switches. In the offline part: a second switching table is calculated, resulting in accordance with a minimization of a cost function.

16 Claims, 9 Drawing Sheets

(51) Int. Cl.
    *H02M 7/49*         (2007.01)
    *H02M 7/5387*     (2007.01)
    *B60L 15/02*       (2006.01)

(52) U.S. Cl.
    CPC ........... *H02M 7/4835* (2021.05); *H02M 7/49* (2013.01); *H02M 7/53871* (2013.01); *B60L 15/02* (2013.01); *B60L 2210/40* (2013.01)

(56) References Cited

U.S. PATENT DOCUMENTS

| | | | |
|---|---|---|---|
| 9,559,610 B2* | 1/2017 | Duan | H02M 7/487 |
| 10,340,813 B2 | 7/2019 | Schumacher et al. | |
| 10,574,154 B1* | 2/2020 | Qiao | H02M 7/53871 |
| 10,700,587 B2 | 6/2020 | Götz | |
| 10,790,743 B2 | 9/2020 | Götz | |
| 2012/0038330 A1 | 2/2012 | Buiatti et al. | |
| 2013/0016549 A1* | 1/2013 | Kieferndorf | H02M 7/487 363/131 |
| 2015/0044520 A1 | 2/2015 | Feuerstack et al. | |
| 2017/0123014 A1* | 5/2017 | Goetz | H02J 7/0024 |

FOREIGN PATENT DOCUMENTS

| | | |
|---|---|---|
| DE | 102016112250 A1 | 1/2018 |
| JP | 08-019264 A | 1/1996 |
| JP | 2007274796 A | 10/2007 |
| JP | 2012525108 A | 10/2012 |
| JP | 2014050197 A | 3/2014 |
| JP | 2015518629 A | 7/2015 |
| WO | WO 2015193439 A1 | 12/2015 |
| WO | WO 2017013125 A1 | 1/2017 |

OTHER PUBLICATIONS

Specht Eduard, et al., "Reducing Computation Effort by Parallel Optimization for Modular Multilevel Converters", IECON 2014—44th Annual Conference of the IEEE Industrial Electronics Society, Oct. 21, 2018, pp. 3991-3996, IEEE, Piscataway, New Jersey, USA, XP033486088.

\* cited by examiner

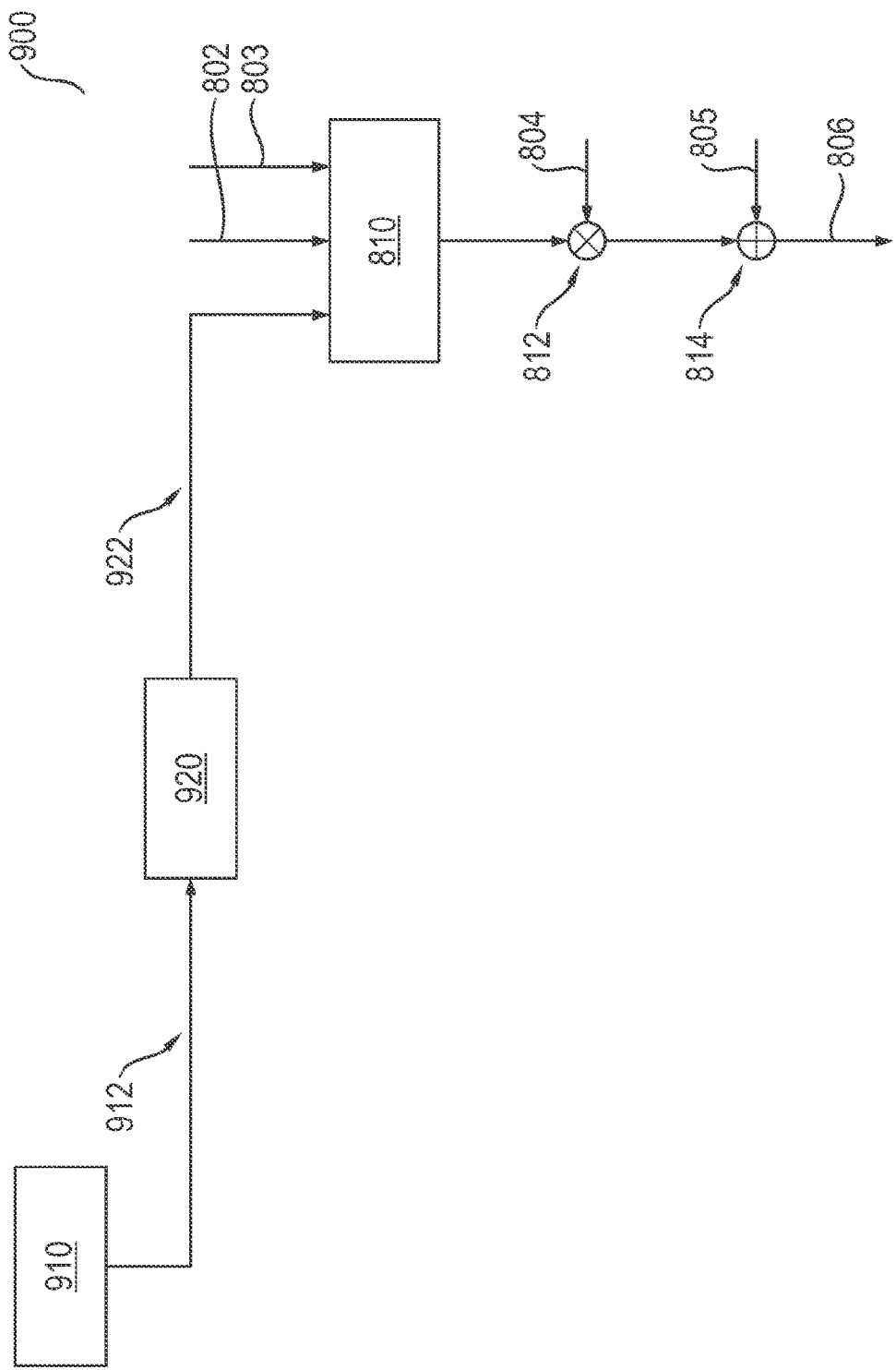

US 11,626,812 B2

CONTROL OF MODULAR MULTILEVEL SERIES/PARALLEL CONVERTERS (MMSPC) BY MEANS OF SWITCHING TABLES AND CONTINUOUS BACKGROUND OPTIMISATION THEREOF

CROSS REFERENCE TO RELATED APPLICATIONS

This application is a U.S. National Phase Application under 35 U.S.C. § 371 of International Application No. PCT/EP2019/025146, filed on May 13, 2019, and claims benefit to German Patent Application No. DE 10 2018 125 728.7, filed on Oct. 17, 2018. The International Application was published in German on Apr. 23, 2020 as WO 2020/078580.

FIELD

The present invention relates to a method for control of a total switching state, e.g., of switching states of all switches of a multi-level converter, including of a modular multi-level converter. Furthermore, a system for implementing this switching control is claimed.

BACKGROUND

In order to obtain an AC voltage of predetermined frequency from a DC voltage, in a conventional power electronics system having a small number of power switches, input and output voltages are switched between a small number of levels, usually two to three, in order to obtain the desired variable on average. In contrast thereto, modern multi-level converters operate according to a scheme of generating the AC voltage by means of a dynamic changeable configuration of energy stores, such as capacitors or energy cells, for example, which are interconnected via a multiplicity of electronic switches. In this case, use is made of significantly more electronic switches, e.g. power semiconductor switches, than in the conventional power electronics system, which makes it possible to form a multiplicity of realizable total switching states and associated output voltages of the multi-level converter with very fine gradations or levels. At the same time there exist a high number of degrees of freedom for realizing an identical voltage level with different total switching states, wherein a controller of the multi-level converter has to allocate a unique state to all switches at any time.

In principle, it is possible to define a respective design of a multi-level converter on the basis of an individual module, e.g. presented in the document DE 10 2015 112 512 A1 in the name of the present applicant. Depending on the circuit arrangement of the switching elements comprised by an individual module, all switching states relating to an interconnection of the energy store likewise comprised can be attained independently of structurally identical individual modules that are additionally connected.

A central multi-level converter in this sense is the modular multi-level converter (MMSPC), described by S. M. Goetz, A. V. Peterchev and T. Weyh, "Modular Multi-level Converter With Series and Parallel Module Connectivity: Topology and Control," in IEEE Transactions on Power Electronics, vol. 30, no. 1, pp. 203-215, January 2015 and furthermore in the documents U.S. Pat. No. 9,502,960 B2 and DE 10 2016 112 250 A1. This converter is distinguished vis a vis conventional modular multi-level converters, described e.g. by R. Marquardt in the document DE 101 03 0301 A1, by virtue of the existence of an additional parallel state, whereby an MMSPC in a phase section can generate and dynamically change almost any desired electrical serial-parallel circuit configuration of module-integrated energy stores. Furthermore, a bypass state, referred to as a bypass, is usually available as well in order to bypass the energy store of a module. Generally, in modular multi-level converters, a module switching state, that is to say the switching states of the switches of the individual module, can be uniquely described in accordance with the following list: parallel, serial, bypass, switched off. One application is represented by a modular multi-phase multi-level converter in which a number of modules in each case are arranged in a phase section, wherein a respective phase section then provides a respective phase of a multi-phase AC voltage.

A basic problem in the control of modular multi-level converters is the high number of degrees of freedom, i.e. the multiplicity of different switching or module states, which initially form the same voltage. A totality of the module states defines an output voltage of the multi-level converter. For operation of the multi-level converter, a control unit of the switching control, a so-called scheduler, has to define and actively control the states of all modules at every point in time. Such state determination and allocation to all switches of all modules take place at a clock frequency of between 1 kHz and 1 MHz, corresponding to 1000 to 1 million times per second.

Various methods are possible for selecting the respective module states for the purpose of generating a desired voltage. One of these methods includes a use of a so-called look-up table or switching table, in which the module states to be switched are defined, which affords the advantage of a low computational complexity and simplicity of an implementation. In this respect, for example, the document WO 2015/193439 A1 describes a multi-phase power converter, the control of which can involve employing a switching table. What is disadvantageous about such a method is that the switching table provides an optimum interconnection only at a certain point in time, if at all. Different discharging of the individual energy cells or stores in the respective modules gives rise constantly to new optimum switching states for the respective desired voltage levels at the output of the multi-level converter, and a total switching state allocated in accordance with the switching table once the latter has been formed and stored will be further and further away from an optimum total switching state as the operating duration increases.

An online optimization method which determines a mathematical optimization in accordance with a present state of all energy stores of the multi-level converter and/or further conceivable constraints, such as uniform loading of the energy stores, for example, would be advantageous here. For a genuine mathematical optimization, in principle all possible switching states, e.g., in the case of ten MMSPC-like modules having at least five switching states per module, in total $5^{10}$ and thus almost $10^7$ equals 10 million possible switching states, per time step would have to be calculated and weighed against one another. A certain number of time steps into the future would then have to be calculated in order to find a best solution in this regard. In the case of M time steps, that would be $(5^{10})^M$ alternatives. Just a calculation for two time steps, with already approximately $10^{21}$ alternatives, would far exceed the limits of a high-performance computer ($10^{15}$ operations per second). Therefore, none of the existing methods hitherto has been able to cope with this colossal computational complexity. Heuristic methods, on the other hand, may indeed—depending on complexity—arrive at solutions online, but these will always also be at a certain distance from an optimum total switching state.

SUMMARY

In an embodiment, the present invention provides a method that controls switching states of a multi-level converter. The multi-level converter has a plurality of modules. Each module of the plurality of modules has: at least one terminal on a first side and at least one terminal on a second side; at least two controllable switches; and at least one energy store. In a first connection between the at least one terminal on the first side and the at least one terminal on the second side, the at least one energy store is arranged in series with a first of the at least two controllable switches. In a second connection between the at least one terminal on the first side and the at least one terminal on the second side, a second of the at least two controllable switches is arranged. The control of the switching states can be divided into a real-time part and an offline part. The method includes, in the real-time part, for each time step: allocating a respective voltage level to a respective voltage requirement by a modulator; determining a respective total switching state of all of the switches in a first switching table for the respective voltage level by a scheduler; and passing the respective total switching state on as a control signal to all of the switches. The method includes, in the offline part: calculating a second switching table by an optimizer in a continuous succession, the second switching table resulting in accordance with a minimization of a cost function, wherein the cost function rates a total switching state, which is formed from pre-defined respective module switching states of the plurality of modules, at least with regard to uniform discharge of all energy stores of the multi-level converter, or minimum on-state losses, or minimum losses in the energy stores, or minimum total losses. A present state of charge of all of the energy stores of the multi-level converter is provided continuously to the optimizer. A row of the first switching table that has the module switching states to be implemented in the multi-level converter is accessed mapping of at least the voltage levels provided by the modulator. The row is used as an address referring to a content of a memory row in a memory of a computing unit that contains the switching table.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 9 schematically shows, in one embodiment of the method according to the invention, a sequence during further address formation by means of a mapping of input variables to the scheduler onto a row of the first switching table.

DETAILED DESCRIPTION

Figure 1:
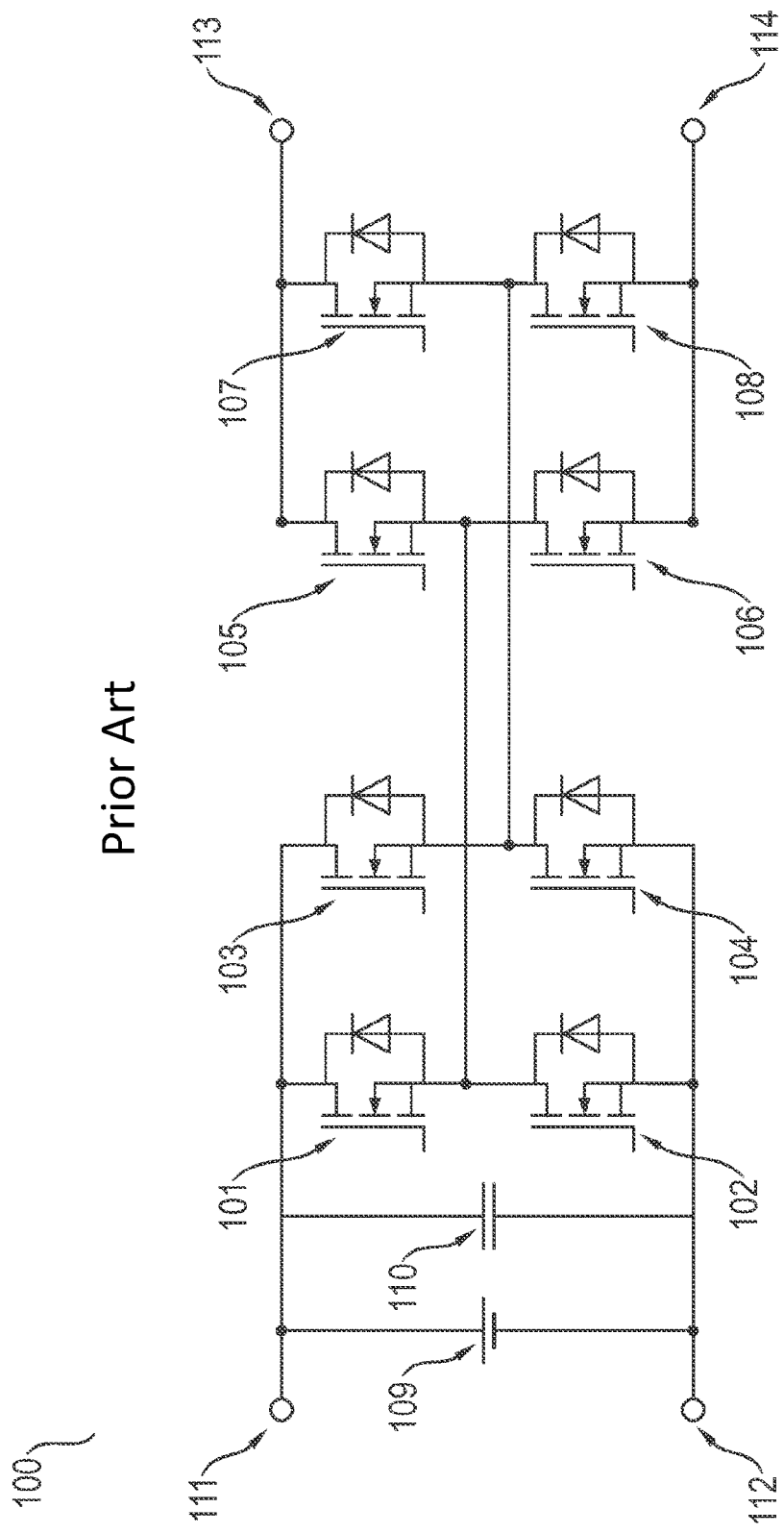
FIG. 1 schematically shows a circuit of a module of a modular multi-level converter in accordance with the prior art.

Embodiments of the present invention provide a method for control of switching states of all switches of a multi-level converter which online, i.e. during operation of the multi-level converter in real time, for a respective voltage requirement, calculates a respective optimum total switching state of the multi-level converter in accordance with predefined constraints and provides it to a controller of the multi-level converter. Moreover, embodiments of the present invention provide a corresponding system which is configured to carry out the method.

In an embodiment of the present invention, a method for control of a total switching state of a multi-level converter is provided, wherein the multi-level converter at least one module, wherein the at least one module has at least one terminal on a first side and at least one terminal on a second side, at least two controllable switches and at least one energy store. In one embodiment, in a first connection between the at least one terminal on the first side and the at least one terminal on the second side, the at least one energy store is arranged in series with a first of the at least two controllable switches, and in a second connection, between the at least one terminal on the first side and the at least one terminal on the second side, a second of the at least two controllable switches is arranged. By virtue of this embodiment, between the first and second terminal the at least one module, the energy store can be connected in series, or it can be bypassed, or an electrical line can be completely interrupted. In a further embodiment, the at least one module has at least two terminals on the first side and at least two terminals on the second side. The at least one energy store is arranged directly between the at least two terminals of the first side or of the second side, a first of the at least two controllable switches is arranged between a first terminal on the first side and a first terminal on the second side, and a second of the at least two controllable switches is arranged between a second terminal on the first side and a second terminal on the second side. By virtue of this embodiment, in the closed state of the at least two switches, the energy store of the at least one module can be connected in parallel with further modules, wherein a series connection or a bypass of the energy store is furthermore possible by means of other switching states. In the case of the method according to the invention, the control of the multi-level converter is divided into a real-time part and an offline part. A real time is interpreted hereinafter in particular such that the corresponding control part is necessarily required as part of the control loop for generating the total switching state required for the control and therefore must never exceed a maximum processing time, in order not to delay the generation of the total switching state. Offline, by contrast, denotes in particular control parts which do not have to have a fixedly known maximum processing duration and/or proceed significantly more slowly than the real-time part, for example more slowly at least by a factor of 10, preferably more slowly at least by a factor of 100, and therefore proceed e.g. concurrently and/or asynchronously with respect to processing of the real-time part. In each time step, in the real-time part, a respective voltage level is allocated to a respective voltage requirement by a modulator, and in a first switching table a respective total switching state of all switches of the multi-level converter is determined for the respective voltage level by a scheduler and the respective total switching state is passed on as control signal to all switches. In the offline part, a second switching table is calculated by an optimizer in a continuous succession, said second switching table assigning respective total switching states to respective voltage levels. The second switching table results in accordance with a minimization of a cost function, wherein the cost function rates a total switching state, which is formed from predefined respective module switching states of the plurality of modules, at least with regard to uniform discharge of all energy stores of the multi-level converter and/or with regard to minimum switching losses and/or minimum on-state losses and/or minimum losses in the energy stores and/or minimum total losses. Finally, a present state of charge of all energy stores of the multi-level converter is provided continuously to the optimizer. The first and second switching tables can differ from one another or be identical at a point in time.

In one embodiment of the method according to the invention, in the real-time part the respective total state of all switches in the first switching table is determined, and in the offline part the second switching table is calculated by an optimizer in a continuous succession, wherein the first and second switching tables can differ from one another at a point in time. After the conclusion of the calculation, the calculated second switching table replaces the first switching table, and from then on is used as the first switching table, whereupon the optimizer begins the calculation of a new second switching table.

The method according to an embodiment of the invention can use a plurality of switching tables, in a manner similar to a so-called shadow memory approach, wherein the real-time part works with one or more tables, but the offline or asynchronous part works with other tables, and the tables are swapped at a specific point in time, e.g. simply by switching over a memory address in a computing unit of a system that carries out the method according to an embodiment of the invention.

Alternatively, however, in another embodiment, in principle, the offline part can also work directly on the switching table of the real-time part, but should as far as possible, to preserve consistency, always swap at least one total state entry. The real-time part accesses this at least one first switching table only in a reading manner.

The method according to an embodiment the invention achieves relocates an optimization problem from the modulator of the real-time part of the control, in which switching-technological methods have been carried out hitherto according to the prior art, into the offline part, in which an optimizer searches for a best second switching table on the basis of a cost function. The modulator can thus maintain its necessarily high speed in order together with the scheduler, in accordance with the first switching table made available, in the multi-level converter, to bring about a total switching state which results in an output voltage of the multi-level converter that corresponds to the respective voltage requirement. In the meantime, in parallel therewith, the optimization is carried out, wherein, after the respective conclusion of the calculations required for this, a new first switching table, tantamount to a new parameterization of the interconnections in a respective total switching state for a respective voltage level to be represented by the multi-level converter, is made available to the scheduler. On the basis of this first switching table, in the further course of events the scheduler then performs a selection of the total switching state for the multi-level converter.

The parameterization or respectively the first switching table or respectively the second switching table, in each case also referred to as look-up table, allocates a combination of switch positions in the respective modules to each of the given N modules usually (2N+1) voltage levels to be represented at the output of the multi-level converter, wherein the respective switch positions combined within a respective module are designated as a respective module switching state. The respective module switching state of a respective module substantially always involves how the energy store comprised by the respective module is interconnected with the further energy stores of the multi-level converter. From the first switching table, the scheduler, for a voltage level that has been quantized and transferred to it by the modulator, seeks a total switching state which is or can be defined by the respective module switching states. In this regard, in the case of an exemplary module having eight switches (see FIG. 1 and the associated description), a total of five module switching states are defined, for which the eight switches assume the switch positions presented in table 1. The module switching states are as follows: "s+" for serial interconnection with positive polarity, "s–" for serial interconnection with negative polarity, "p" for parallel interconnection, "b+" for bypass with positive polarity, and "b–" for bypass with negative polarity. In this case, the positive or respectively negative polarity denotes which polarity of the two terminals on the first side of the module is switched through to the two terminals on the second side of the module. In the case of the bypass or a module bypass, this is tantamount to switching through via a high-side connection, also discernible as lower module busbar, electrically connected to the negative terminal of an energy store, or a low-side connection, also discernible as upper module busbar, electrically connected to the positive terminal of an energy store, of the switches of the module that are arranged in half-bridges. A further description in this respect is given in the figure description concerning FIG. 1.

TABLE 1

Module switching states s+, s–, p, b+, b– and respective switch positions of the eight switches S1 to S8 from FIG. 1.

| | $S_1$ | $S_2$ | $S_3$ | $S_4$ | $S_5$ | $S_6$ | $S_7$ | $S_8$ |
|---|---|---|---|---|---|---|---|---|
| s+ | ON | OFF | ON | OFF | OFF | ON | OFF | ON |
| s– | OFF | ON | OFF | ON | ON | OFF | ON | OFF |
| p | ON | OFF | OFF | ON | ON | OFF | OFF | ON |
| b+ | ON | OFF | ON | OFF | ON | OFF | ON | OFF |
| b– | OFF | ON | OFF | ON | OFF | ON | OFF | ON |

Independently of the scheduler and simultaneously or in parallel with the scheduler, the optimizer calculates a new second switching table and in so doing takes account of the present state of the system, in order to achieve at least one mathematically described goal by minimizing the cost function. By way of example, for the goal of charge balancing between modules, that is to say that over long operating durations all modules or all energy stores comprised by the respective modules deliver or take up as far as possible the same charge, the present state of charge of the respective modules or of the respective energy stores comprised thereby is of importance in order that the optimizer can decide which module is intended to deliver or take up power to a particularly high degree and this module is intended to be provided e.g. preferably for serial connections "s+" or "s−" during operation.

The optimizer preferably uses numerical optimization methods for determining the new second switching table. For this purpose, the optimization problem is advantageously formulated as a mathematical problem in which the cost function to be minimized has at least one term in which the at least one goal is formulated mathematically as a distance and/or a summation variable, wherein the goal is approached or achieved precisely when the distance and/or the summation variable become(s) optimal. Optimal is usually to be understood as minimal. If a summation variable is possibly maximized, this mathematical maximization can be reduced to a minimization by multiplication by −1. Specific boundary conditions can also be added to that. Furthermore, additional terms corresponding to additional goals, optionally provided with a respective scaling factor, can also be mathematically linked with the at least one term. For example for a voltage level that can respectively be generated by the multi-level converter, the optimizer then calculates that total switching state which corresponds to a respective minimum of the cost function, and stores this total switching state in the second switching table. Under certain circumstances it is possible for a plurality of total switching states to bring about the same minimum of the cost function and likewise to be stored in the second switching table. In this case, the total switching state corresponds to the totality of the switch positions of all switches of the multi-level converter or respectively of all module switching states which are to be set or are set for providing a desired or predefined voltage level. A respective switching table, i.e. either the first switching table or the second switching table, thus allocates at least one total switching state to each voltage level or at least one module switching state to each module. Since the first switching table is accessed only in a reading manner by the scheduler, but advantageously only in a writing manner by the optimizer, specifically during the transfer of the presently determined second switching table to the first switching table, both scheduler and optimizer can proceed asynchronously in parallel without relatively great synchronization outlay.

In one embodiment of the method according to the invention, the first switching table is replaced by the newly calculated second switching table after a predefined time. This means that the first switching table is not overwritten as soon as the optimizer has finished the calculation of the new second switching table, but rather only after a predetermined time period has elapsed. This predetermined time period can be formed by a fixed time interval, for example, but it can also be formed randomly by a random number generator. Furthermore, it can be determined by possibly limited computing resources, and/or be formed by a necessity of making an improved first switching table available to the scheduler.

An assessment of the present state of charge of all energy stores of the multi-level converter can influence the cost function, with the main task of making a discharge of the respective energy stores as uniform as possible. This advantageously maximizes a total discharge capacity and also lengthens overall a lifetime of a respective energy store. As an alternative thereto or jointly therewith, a contribution to the cost function can be formed by an assessment of losses, such as arise e.g. as a result of switching losses in the semiconductors and/or an ohmic loss in the case of parallel interconnection of individual modules with neighboring modules and/or as a result of ohmic losses in energy stores and/or semiconductors (on-state losses). A description concerning the optimization in this regard of the second switching table and thus of the later first switching table is given further below.

In a further embodiment of the method according to the invention, a number of modules are connected in series to form at least one phase section which forms a respective phase of an AC voltage. The respective phase sections can be connected at a respective phase section start via a double neutral point. At their respective phase section end, the respective modules terminating the respective phase section can be short-circuited at their terminals on their respective second side and at that very location can form the respective phase for operation of a multi-phase electric machine or of an AC voltage power supply system device. The multi-phase electric machine can drive an electric vehicle, for example.

As mentioned above, the exemplary module having eight switches has five different module switching states. If a number of such exemplary modules are strung together to form phase sections, e.g. in each case six exemplary modules to form a total of three phase sections, then the respective last exemplary module in the respective phase section has only four module switching states, since in this case the module switching states "s−" and "b−" generate the same switching set. Therefore, for each phase section or each phase in the example with six modules per phase section, a number of $5^5 \cdot 4 = 12500$ different switching states is obtained. If the respective phase sections are connected at their respective phase section start to form a double neutral point, the three phases are no longer independent of one another and a total of $12500^3$ possible module switching states is obtained for the multi-level converter constituted by the exemplary modules. However, not all combinations of interconnections between the exemplary modules are expedient. In this regard, it is not expedient, for example, for neighboring exemplary modules that simultaneously have a module switching state "s+" or "s−" to be connected to one another. Hereinafter, therefore, a description is given of how a totality of all possible module switching states is reduced to a smaller set of implementable module switching states of the modules connected to one another in a respective phase section.

In order to reduce losses, it is advantageous to divide the respective phase sections into large groups of modules connected in parallel with one another and to avoid the bypass. Therefore, in yet another embodiment of the method according to the invention, from a totality of all possible module switching states, the assigned or assignable module switching states are formed from those module switching states which can result from a parallel interconnection of all modules in a basic switching state. However, this does not restrict the possibility of using in principle all possibilities for combination of module switching states for optimization. However, if only those module switching states which result from the parallel interconnection are used, then the basic switching state for neighboring modules is thus the parallel module switching state "p". As is evident from the description concerning FIG. 2, there are N−1 negative and N positive voltage levels l, where l∈(−N+1, . . . , N). In order to obtain a desired voltage level l, l modules have to be connected in series. In this case, a number $n_{l\geq 0}$ of all possible module switching states in the case of positive voltage levels is given by $$n_{l\geq 0} = \binom{N}{l} = \frac{N!}{l! \cdot (N-l)!}, \quad (1)$$

and a number $n_{l<0}$ of all possible module switching states in the case of negative voltage levels is $$n_{l<0} = \binom{N-1}{-l} = \frac{(N-1)!}{(-l)! \cdot (N-l+l)!}. \quad (2)$$

A total number $n_{tot}$ of all possible module switching states for the implementable voltage levels is given by $$n_{tot} = \sum_{l=-N+1}^{-1} \binom{N-1}{-l} + \sum_{l=0}^{N} \binom{N}{l}. \quad (3)$$

If a module is defective, a parallel module switching state is no longer possible for this module and is replaced by the bypass "b+" or "b−". However, this does not reduce the total number $n_{tot}$ of possible module switching states within a phase section.

Figure 2:
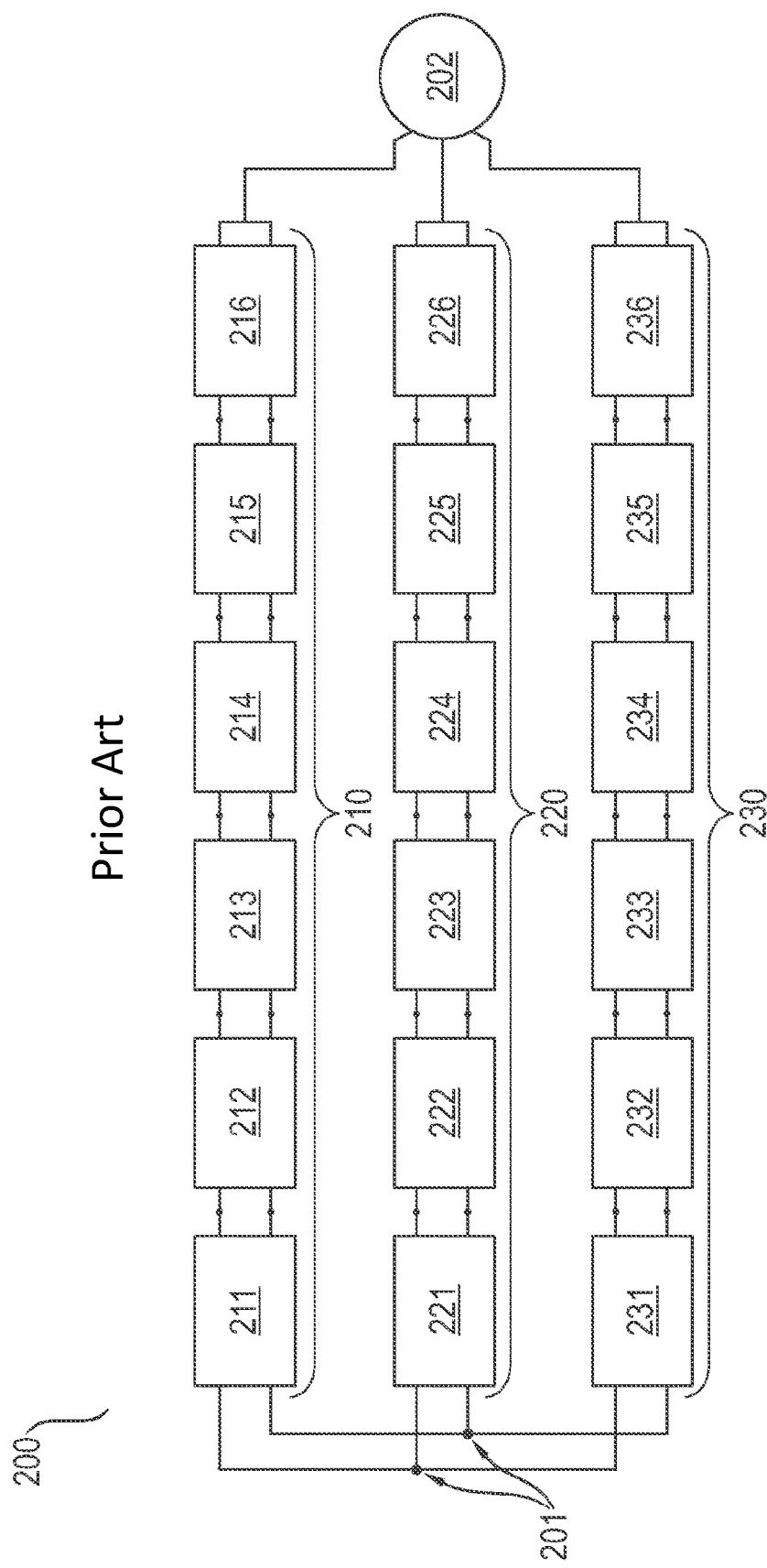
FIG. 2 shows a circuit concerning a modular three-phase multi-level converter in accordance with the prior art.

In the case of an arrangement of N=6 modules in a phase section, such as e.g. in the case of a three-phase multi-level converter in FIG. 2, the total number of implementable module switching states is $n_{tot}$=95. All these module switching states are stored in an ($n_{tot}$×N) matrix A, wherein $$A=(a_{mj}) \text{ where } a_{mj} \in \{s+,s-,p,b+,b-\}. \quad (4)$$

The matrix A is established such that a respective line or row m lists a respective set of module switching states for all j∈{1, . . . , N} modules of a phase section. A respective column j then contains the module switching states for the j-th module of the phase section. Exclusively the module switching states stored in the matrix A are available for further optimization of the second switching table, i.e. for minimization of the cost function.

In a further embodiment of the method according to the invention, a total cost function is formed from the cost function and at least one constraint by way of at least one state variable from the following table: current ripple, efficiency of the multi-level converter, aging of the respective energy stores, electromagnetic compatibility, distortion-free current/voltage profiles, module temperature of a respective modules, temperature development (first derivative of the module temperature with respect to time) of a respective module in particular as a statement regarding a respective module loading, switching errors, on-state losses, fail-safety, in particular targeted conservation of specific modules for maximizing fail-safety, compensation of identified weaknesses or different limits of individual modules, rotational speed of an electric machine driven by the multi-level converter, output frequency, power supply system frequency, phase currents. Further state variables that can be used to form further constraints for the cost function are conceivable.

A subselection or a compilation from the above list represents e.g. the constraints that firstly all modules ought to be at an identical module temperature and that secondly the current ripple ought to be minimal. The individual module temperature t (with unit [K]) of a respective module is reported to the optimizer by a respective temperature sensor at the respective module. A totality of all module temperatures results for the example of a three-phase multi-level converter with K=3 phase sections, k∈{a, b, c}, and N=6 modules, j∈{1, . . . , N} per k-th phase section, as a (K×N) matrix T, wherein $$T=(t_{kj}) \text{ where } t_{kj} \in [230,340]. \quad (5)$$

The current ripple is dependent on the respective phase current $I_k$ (with unit [A]), wherein for the example with K=3 phase sections the result is $$I=(I_k) \text{ where } I_k \in [-200,200] \text{ and } k \in \{a,b,c\} \quad (6)$$

In addition to these two constraints, a third constraint that can be taken into account is the abovementioned reduction of losses, which results in the module switching states indicated by matrix A in equation (4). Finally, according to the an embodiment of invention, the cost function is influenced by the uniform discharge of all energy stores of the multi-level converter, which shall be identified here as SOC, an abbreviation that stands for "state of charge", (with no unit, indicated in %), wherein here, too, for the example mentioned above, the result is a (K×N) matrix $$SOC=(soc_{kj}) \text{ where } soc_{kj} \in [0,100]. \quad (7)$$

All these variables are combined by the total cost function G(SOC,T,I,A).

As an example of a simple algorithm that concentrates solely on the uniform discharge of all $N_{tot}$=K*N energy stores of the multi-level converter, the following cost function arises with a module current $I_i$ related to a respective module i and with a state of charge $soc_i$ related to a respective module i:

$$G = \sum_{i=1}^{N_{tot}} I_i(soc_i - soc_{mean}), \text{ wherein} \quad (8)$$

$$soc_{mean} = \frac{1}{N_{tot}} \sum_{i=1}^{N_{tot}} soc_i.$$

An optimization of the cost function in equation (8) advantageously leads to a second switching table which permits a discharge of those modules whose state of charge is higher than a mean state of charge $soc_{mean}$, and a charging of those modules whose state of charge is below $SOC_{mean}$.

As a further example of a simple algorithm that concentrates solely on the efficiency of the multi-level converter, the following cost function arises with a module current $I_i$ related to a respective module i:

$$G = \sum_{i=1}^{N_{tot}} I_i^2. \quad (9)$$

Precisely in the case of the modular multi-level converter with the respective module as described in FIG. 1, ohmic losses advantageously decrease as a result of the parallel interconnection of neighboring modules. The efficiency of this modular multi-level converter can therefore be maximized by a minimization of the respective squared module currents $I_i^2$, which are directly proportional to the ohmic losses.

In still another embodiment of the method according to the invention, for the respective state variable which influences the respective at least one constraint and which changes only within a respective time frame specific to it, an associated term in the total cost function is calculated anew only after the respective time frame has elapsed. According to the invention, the calculation of the total cost function G thus takes account of the fact that the respective state variables change differently over time. Since some state variables, such as the module temperature or the state of charge, for example, change more slowly than the optimizer needs time to calculate a new second switching table, the associated constraints also have to be evaluated anew again in the optimizer only if a change has arisen after the respective time frame has elapsed. For example, on account of a high heat capacity and a high electrical capacitance of the energy stores of the multi-level converter, both module temperature and state of charge change only slowly and will hardly have changed significantly in relation to a time frame of one second. Therefore, for the optimization of the total cost function, the terms in this regard do not have to be calculated anew within this time frame. By contrast, a current flowing through the respective module changes within a time frame predefined by a switching frequency and is dependent on the respective phase current. Advantageously, therefore, a present solution space for the optimizer for the total cost function G(SOC,T,I,A) of the above example within a time frame of e.g. one second is restricted by a fixed value of the present temperature $T_{pres}$ and of the present state of charge $SOC_{pres}$. The optimizations to be carried out by the optimizer in this time frame, i.e. seeking a minimum of the total cost function $G(SOC_{pres}, T_{pres}, I, A)$ by way of variation of module switching states A which were preselected from all possible switching states with regard to minimal switching losses, is therefore advantageously limited to the phase currents I:

$$G_{timeframe}(I,A) = G(SOC_{pres}, T_{pres}, I, A). \tag{10}$$

The optimization with regard to switching losses is maximal precisely if only maximally one module per switching step changes its module switching state. If only a current direction of a phase current influences an optimization algorithm, the optimization algorithm can be limited to having to decide whether either a voltage level which is higher by one or a voltage level which is lower by one is chosen and whether the phase current corresponding thereto is positive or negative. All these circumstances taken together lead to the result that for each of the $n_{tot}$ module switching states of the modules of a phase section there is exactly one optimum set of successor module switching states, which is dependent on the output voltage required and the direction of the phase current. For the example mentioned above, a phase current distribution along the modules situated in a phase section is then estimated depending on the module switching states and the total cost function $G_{timeframe}(I,A)$ is calculated in accordance with equation (10). Four optimum module switching states which optimize the total cost function are allocated subsequently to the respective module switching state as next switching step, wherein said module switching states are respectively dependent on the voltage level and the current direction. The four respective optimum sets of module switching states are entered with their respective row number $m \in \{1, 2, \ldots, n_{tot}\}$ in the matrix A in an ($n_{tot} \times 2 \times 2$) matrix B, given by $$B = (s_{hpq}) \text{ where } s_{hpq} \in \{1, 2, \ldots, n_{tot}\} \tag{11}$$

A row $h \in \{1, 2, \ldots, n_{tot}\}$ of this matrix B represents the present module switching states or their row position in the matrix A for all modules of a respective phase. An index p=1 is chosen if the required voltage level l is lower than the present voltage level; otherwise, p=2 is chosen. In the case of negative phase currents, the index q=1 is chosen; otherwise, q=2 is chosen. As an example, consideration shall be given to a present set of module switching states 40, i.e. row 40 in matrix A with N=6 module switching states of the respective modules of the phase section, the voltage requirement shall be lower than the present output voltage and the present current direction of the phase current shall be positive. The entry $s_{40,1,2}$ would then be chosen in the matrix B. The respective matrices $B_a$, $B_b$, $B_c$ for the three phases of the example represent, together with the matrix A, the second switching table, or at transfer to the scheduler the first switching table, according to which the multi-level converter is controlled.

Depending on the formulated task of the optimization problem, it is possible to adapt an above dimensioning of the matrix B or of the respective matrices $B_a$, $B_b$, $B_c$ in the case of three phases, which resulted as an ($n_{tot} \times 2 \times 2$) matrix for the example above. Whereas for the example above it is sufficient to consider only the current direction or only a sign of the respective phase current, more complex divisions are also conceivable. For the example of the phase current, this would then result in an extension of the dimensioning designated by index k in equation (11). A division can be effected according to the current amplitude, for example. Accordingly, it is possible to use for example the division less than −150 A, −150 A to −100 A, −100 A to −50 A, −50 A to 0 A, 0 A to 50 A, 50 A to 100 A, 100 A to 150 A, and greater than 150 A. Alternative divisions into ranges are likewise conceivable within the meaning of the invention.

For the example of the three-phase multi-level converter mentioned above, an optimization algorithm that carries out the method according to an embodiment of the invention can be implemented e.g. as part of a control of the three-phase multi-level converter on a Zyne®-7000@Xilinx® chip, which has dual-core ARM® Cortex®-A9 processors with programmable Artix®-7 logic. As also described in FIG. 3, the scheduler or the switching controller is implemented on the programmable logic, while in parallel therewith the optimization algorithm is implemented on a Cortex®-A9. The required parameters, here temperature and state of charge, are transferred via an AXI full interface to the Cortex®-A9, which stores the nearest optimum module switching states or the row number thereof in the matrix A in the three matrices $B_a$, $B_b$, $B_c$ (one for each phase a, b and c, respectively, in the above example) and sends the latter together with the matrix A as a new second switching table to the scheduler on the programmable logic. This then first switching table is regularly overwritten by the then respectively newly calculated or optimized second switching table, but on a much greater timescale than the one on which the scheduler works. The scheduler is thus freed of any further computational load and only has to select the respectively nearest module switching state $(s_{hpq})_a$, $(s_{hpq})_b$, $(s_{hpq})_c$ depending on the required voltage levels $(l_a, l_b, l_c)$ and the phase currents $(I_a, I_b, I_c)$. A respective result $S_a$, $S_b$, $S_c$ of the selection for each phase a, b, c is then a respective row of the matrix A with the module switching states stored there. Parallel processing of switching controller and optimization algorithm thus allows fast switching frequencies, e.g. of the order of kHz or higher, since the calculation of optimum switching tables is carried out asynchronously and also proceeds on a greater timescale, e.g. of the order of hertz.

However, it is also conceivable that the optimization algorithm that carries out the method according to an embodiment of the invention and the switching controller to be implemented on a common digital signal processor (DSP) without further logic such as a field programmable gate array (FPGA), complex programmable logic device (CPLD) or the like. In this case, the scheduler runs as a customary sequential process on the signal processor with fixed, real-time-enabled scheduling, i.e. with guaranteed maximum delays and guaranteed maximum deadlines, such that a predefined minimum rate or reaction time, e.g. of a power supply system regulation or machine regulation, is complied with. The power supply system or machine regulation and the scheduler can be called up e.g. by way of a respective interrupt. In parallel therewith the optimization runs as a further process or thread almost independently with a significantly longer deadline or no deadline at all. On account of the first switching table being accessed by the scheduler only in a reading manner, the optimization algorithm accessing said first switching table for a short time in a writing or copying manner, a largely causal separation of both processes or threads can be achieved. One and the same processor optionally having a plurality of cores, can implement the optimization algorithm in pauses of the scheduler or of other processes acting on the real-time part, such as e.g. the power supply system or machine regulation, without the scheduler or said other processes being adversely affected. The scheduler can be represented e.g. as pure input-value-dependent read-out of the correspondingly nearest module switching states from a memory and direct transfer to an I/O unit of the processor.

In a further embodiment of the method according to the invention, a row of the first switching table that has the module switching states to be set in each case in the multi-level converter in accordance with a respective voltage level is accessed by means of a mapping of the respective voltage levels provided by the modulator, wherein the row can also be used as an address referring to the content of the row in the memory containing the switching table. A further parameter for the mapping can be the current direction, for example. This direct conversion of input variables to the scheduler into an addressing specification for finding module switching states in the first switching table is advantageous if dedicated logic, which may optionally be programmable, is not available. The mapping is effected by bitwise logic operations, bitwise concatenation, sums and/or differences and/or multiplications by multiples of two and/or divisions by multiples of two. In this way, the calculation of the address of the module switching states to be output can be represented by a simple arithmetic operation that does not require a floating point arithmetic unit or complex jump operations since, in the case of the mapping provided by the method according to the invention, the input variables themselves advantageously form the address or row in the first switching table. One example of such address formation is presented in table 2.

Table 2: Example of address formation from current direction and voltage level provided by the modulator as input variables for access to a corresponding row in the first switching table. The address or row is formed directly from a combination of the present total switching state with the combined bits from the input variables, here voltage requirement and current direction, wherein for a direct jump within the memory of the computing unit, a start address of a beginning of a position of the first switching table within the memory is also added.

| Present total switching state | Voltage requirement | Current direction |
|---|---|---|
| 00 ... 00 | 0 (level downward) | 0 (from the phase section) |
| 00 ... 00 | 0 (level downward) | 1 (into the phase section) |
| 00 ... 00 | 1 (level upward) | 0 (from the phase section) |
| 00 ... 00 | 1 (level upward) | 1 (into the phase section) |
| 00 ... 01 | 0 (level downward) | 0 (from the phase section) |
| 00 ... 01 | 0 (level downward) | 1 (into the phase section) |
| 00 ... 01 | 1 (level upward) | 0 (from the phase section) |
| 00 ... 01 | 1 (level upward) | 1 (into the phase section) |
| . | . | . |
| . | . | . |
| 11 ... 01 | 0 (level downward) | 0 (from the phase section) |
| 11 ... 01 | 0 (level downward) | 1 (into the phase section) |
| 11 ... 01 | 1 (level upward) | 0 (from the phase section) |
| 11 ... 01 | 1 (level upward) | 1 (into the phase section) |

In a further embodiment of the method according to the invention, when a plurality of alternative total switching states of the multi-level converter are present, the scheduler makes a selection in accordance with a predetermined rule. The scheduler makes this selection e.g. randomly or according to deterministic rules. One such deterministic rule may e.g. stipulate making the selection strictly according to the previous frequency of use.

In yet another embodiment of the method according to the invention, in the real-time part a machine regulator is arranged in the sequence upstream of the modulator and applies predefinitions to the modulator in accordance with the difference between an actual and a desired phase current of an electric machine connected to the multi-level converter. The exact arrangement of the machine regulator in the real-time part is evident from FIG. 3. Alternatively, a device for AC voltage power supply system regulation can also be involved here if the multi-level converter operates as an AC voltage power supply system device. If the electric machine is driven by the multi-level converter, however, then predefinitions concerning torque or rotational speed requirements are intended to be made by the machine regulator.

In a further embodiment of the method according to the invention, the modulator carries out at least one switching modulation in accordance with the following list: PWM generation, sigma-delta modulation, nearest-level modulation, pulse density modulation, spectral regulation. These are methods for switching modulation that are known from the prior art. An embodiment of the method according to the invention enables such a switching modulation to be carried out by the modulator in the real-time part without impairment by the optimization algorithm.

Furthermore, a system for control of a total switching state of a multi-level converter is claimed, wherein the multi-level converter has at least one module. The at least one module has at least one terminal on a first side and at least one terminal on a second side, at least two controllable switches and at least one energy store. In a first configuration, in a first connection between the at least one terminal on the first side and the at least one terminal on the second side, the at least one energy store is arranged in series with a first of the at least two controllable switches, and in a second connection, between the at least one terminal on the first side and the at least one terminal on the second side, a second of the at least two controllable switches is arranged.

By virtue of this embodiment, between the first and second terminals of the at least one module, the energy store can be connected in series, or it can be bypassed, or an electrical line can be completely interrupted. In a second configuration, the at least one module has at least two terminals on the first side and at least two terminals on the second side. The at least one energy store is arranged directly between the at least two terminals of the first side or of the second side, and a first of the at least two controllable switches is arranged between a first terminal on the first side and a first terminal on the second side. A second of the at least two controllable switches is arranged between a second terminal on the first side and a second terminal on the second side. In the system according to an embodiment of the invention, the control is divided into a real-time module and an offline module, wherein the real-time module has at least one modulator and a scheduler. For each time step the modulator allocates a respective voltage level to a voltage requirement. For the respective voltage level the scheduler determines a respective total switching state of all switches in a first switching table and passes on the respective total switching state as control signal to all switches. The offline module comprises an optimizer, wherein the optimizer calculates a second switching table in a continuous succession in accordance with a cost function. The cost function rates a total switching state, which is formed from a multiplicity of predefined module switching states, with regard to uniform discharging of all energy stores of the multi-level converter, wherein a present state of charge of all energy stores of the multi-level converter is to be provided continuously to the optimizer. For this purpose, the system provides at least one respective computing unit for the real-time module and the offline module.

In a further configuration of the system according to the invention, in the real-time module the modulator is configured to determine the respective total state of all switches in the first switching table. In the offline module, the optimizer is configured to calculate the second switching table in a continuous succession, wherein the first and second switching tables can differ from one another, wherein after the conclusion of the calculation, the calculated second switching table replaces the first switching table, and from then on is to be used as the first switching table, and the optimizer begins the calculation of a new second switching table.

In yet another configuration of the system according to the invention, from a totality of all possible module switching states, the predefined module switching states are formed from those module switching states which can result from a parallel interconnection of all modules of the plurality of modules from a basic switching state.

In a further configuration of the system according to the invention, the system additionally has at least one sensor which is assigned to at least one state variable of an overall system, wherein the overall system comprises the multi-level converter, the controller of the total switching state of the multi-level converter and an electronic consumer that taps off the output voltage of the multi-level converter, wherein a constraint for the cost function is formed by way of the at least one state variable by means of at least one measurement variable provided by the at least one sensor and a total cost function results from said constraint together with the cost function, and wherein the at least one state variable is taken from the following table: current ripple, efficiency of the multi-level converter, aging of the respective energy stores, electromagnetic compatibility, distortion-free current/voltage profiles, module temperature of a respective module, temperature development (first derivative of the module temperature with respect to time) of the respective module, in particular as a statement regarding a module loading, switching errors, on-state losses, fail-safety, in particular targeted conservation of specific modules for maximizing fail-safety, compensation of identified weaknesses or different limits of individual modules, rotational speed of an electric machine driven by the multi-level converter, output frequency, power supply system frequency, phase currents.

In yet another configuration of the system according to the invention, the real-time module of the system additionally has a machine regulator designed to apply predefinitions to the modulator in accordance with a difference between an actual and a desired phase current of an electric machine.

Finally, a modular multi-level converter equipped with the system according to an embodiment of the invention is claimed, which is designed to carry out the method according to the invention, and wherein a respective module has at least four switches (sufficient for a multi-level converter without parallel connection) and, in one preferred configuration, eight switches (correspondingly for a multi-level converter with parallel connection). In the case of a multi-level converter according to the invention having at least four switches, at least one half-bridge is arranged on each side. In the case of a multi-level converter according to the invention having eight switches, four half-bridges are arranged from the eight switches, wherein in a respective module the first two half-bridges are interconnected in parallel with the at least two terminals on the first side, the second two half-bridges are interconnected in parallel with the at least two terminals on the right side, and there is an electrical connection between a respective low-side switch and a high-side switch of a respective half-bridge on the first side and on the second side of the respective module.

Further advantages and configurations of the invention are evident from the description and the accompanying drawings.

It goes without saying that the features mentioned above and those yet to be explained below can be used not only in the combination respectively indicated, but also in other combinations or by themselves, without departing from the scope of the present invention.

The figures are described in an inter-related and all-embracing manner; identical components are assigned the same reference signs.

FIG. 1 schematically shows a circuit of a module 100 of a modular multi-level converter with a possibility of serial/parallel interconnection in accordance with the prior art. In the arrangement there are four half-bridges each having two switches "S1" 101 and "S2" 102, and respectively "S3" 103 and "S4" 104, and respectively "S5" 105 and "S6" 106, and respectively "S7" 107 and "S8" 108, an energy store 109, and a capacitor 110. A respective switch 101, 102, 103, 104, 105, 106, 107, 108 is represented by a circuit symbol for a MOSFET with a body diode intrinsically present. In case two half-bridges 101, 102 and 105, 106, and respectively 103, 104 and 107, 108 are connected to one another between their respective low-voltage-side switches 102 and 106 and respectively 104 and 108 and the associated high-voltage-side switches 101 and 105 and respectively 103 and 107. The module 100 has two first, here left, terminals 111 and 112 and two second, here right, terminals 113 and 114. Depending on a respective module switching state, that is to say depending on switching states of the switches of the module 100 at an identical point in time, the module 100 and respectively or the energy store 109 can be interconnected with further structurally identical modules in order thus to effect a serial interconnection or a parallel interconnection or a bypass of the energy store 109. A first module switching state, designated as "s+" for serial interconnection with positive polarity, is formed by a series connection of the switches 101 and 106 and also the switches 103 and 108. A second module switching state, designated as "s−" for serial interconnection with negative polarity, is formed by a series connection of the switches 102 and 105 and also the switches 104 and 107. A third module switching state, designated as "p" for parallel interconnection, is formed by a series connection of the switches 101 and 105 and also the switches 104 and 108. A fourth module switching state, designated as "b+" for bypass or module bypass through the switches on the low-voltage side, is formed by a series connection of the switches 102 and 106 and also the switches 104 and 108. A fifth module switching state, designated as "b−" for bypass or module bypass through the switches on the high-voltage side, is formed by a series connection of the switches 101 and 105 and also the switches 103 and 107. All module switching states with respective switch positions within the module 100 are listed in table 1.

FIG. 2 schematically shows a circuit concerning a modular three-phase multi-level converter 200 in accordance with the prior art. Each of the three phases is formed with in each case six modules 100 of the design from FIG. 1. The first phase is formed by a first phase section 210 having modules 211, 212, 213, 214, 215, 216, the second phase is formed by a second phase section 220 having modules 221, 222, 223, 224, 225, 226, and the third phase is formed by a third phase section 230 having modules 231, 232, 233, 234, 235, 236. A respective phase section start is given by the modules 211, 221, 231, and a respective phase section end is given by the modules 216, 226, 236. The three phases formed at the respective phase section end of a respective phase section 210, 220, 230 drive an electric machine 202, which may be e.g. a traction motor of an electric vehicle. At the respective phase section start of the respective phase sections 210, 220, 230, the modules 211, 221, and 231 are connected via a double neutral point 201. If all six modules 100 of a respective phase section 210, 220, 230 are interconnected serially "s+", then the respective energy stores 109 in the respective phase section 210, 220, 230 form a series circuit and a six-fold module voltage is obtained. Given a number N of modules per phase, a phase voltage of N times the module voltage can thus be obtained. Per phase the last modules 216, 226, 236 are respectively short-circuited, for which reason these modules 216, 226, 236 are not allowed to switch into the parallel module switching state "p", in order to avoid a short circuit of the respective energy stores 109 of these modules 216, 226, 236. A basic state of these last modules 216, 226, 236 is always formed by the module switching state "b−", which corresponds to the module switching state "s−". Therefore, only ever N−1 negative voltage steps can be formed by the modular multi-level converter 200. On the other side, the energy stores 109 of the respective modules 211, 221, 231 are interconnected in parallel, in principle, via the double neutral point 201. This results in a mutual dependence of the three phases in the phase sections 210, 220, 230. Together with a zero value established by the bypass of all modules 100, given N modules in the multi-level converter a number L of representable voltage levels results as $$L=N+(N-1)+1=2N. \quad (1)$$

Figure 3:
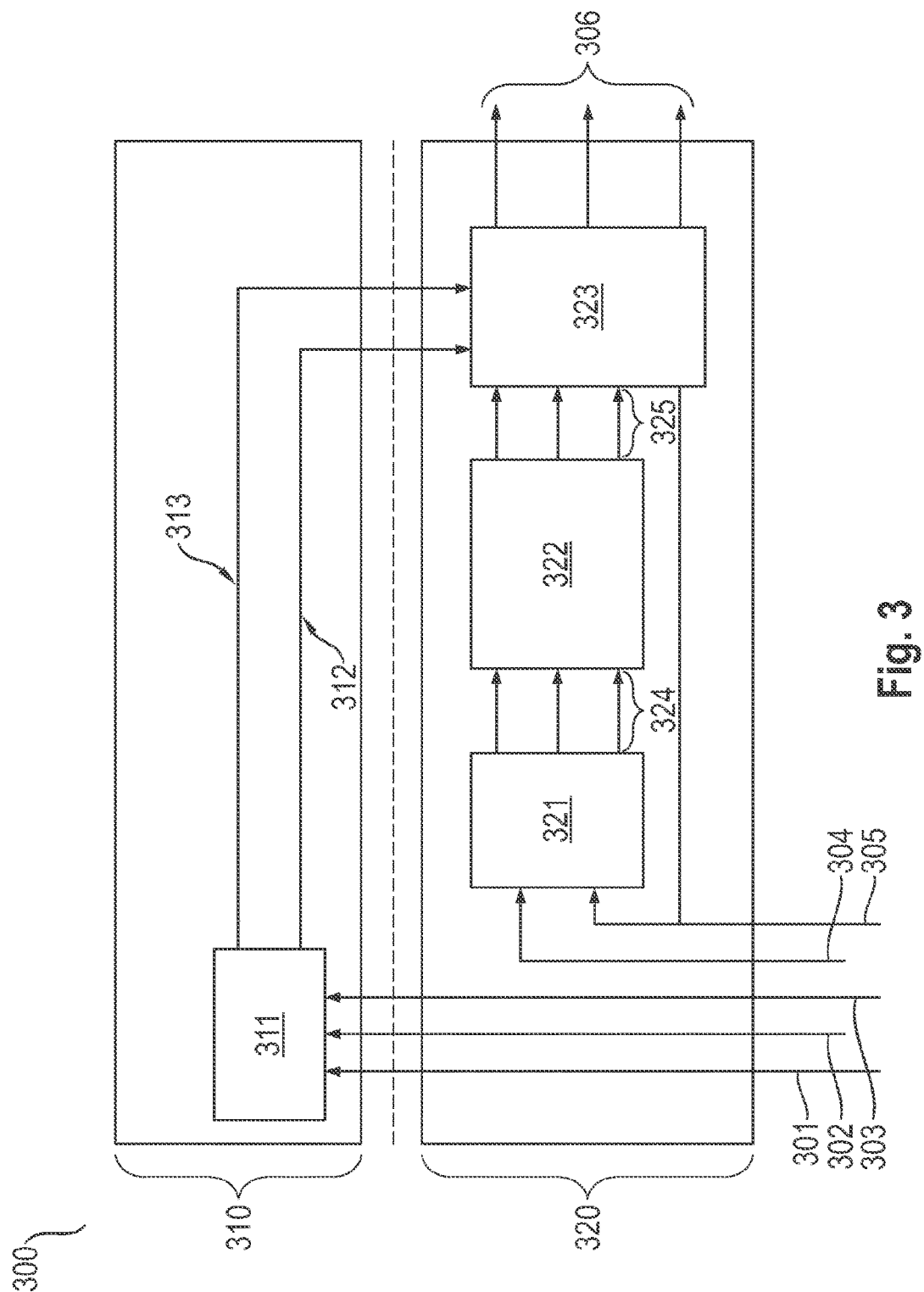
FIG. 3 schematically shows, in one embodiment of a method according to the invention, a block diagram concerning a division according to the invention of control of a multi-level converter into real-time and offline parts.

FIG. 3 schematically shows, in one embodiment of the method according to the invention, a block diagram 300 concerning a division according to the invention of control of a multi-level converter into an offline part 310 and a real-time part 320. The offline part 310 comprises an optimizer 311, which can be implemented in terms of hardware technology on an ARM® Cortex®-A9 processor. The real-time part 320, which can be implemented in terms of hardware technology on a programmable logic separately from the implementation of the offline part 310, comprises a modulator 322 and a scheduler 323, and optionally a machine regulator 321. As input the optimizer 311 receives from a respective sensor, for example, measurement variables concerning the state of charge 301 of a respective energy store, or else concerning a respective module temperature 302, or else concerning switching errors 303. From a totality of all possible module switching states for a respective voltage level, an optimization algorithm executed on the optimizer seeks those module switching states which, in order to minimize losses, can result from a parallel interconnection of all modules from a basic switching state, and writes them to a matrix $A_j$ 313 individually for each phase section j. Furthermore, for these module switching states of the respective matrix A 313, by means of a cost function, e.g. equation (10), the optimization algorithm seeks the respective best nearest set (encompassing each module of the phase section j) of module switching states for the phase section and writes the row number thereof in the matrix A 313 into an $(n_{tot} \times 2 \times 2)$ matrix $B_j$ 312. The row number in the matrix $A_j$ 313 is stored in an element of the matrix $B_j$ 312 depending on a set voltage and a current direction. Since only a change by in each case on voltage level upward or downward or by one current step upward or downward is considered, a dimension of 2×2 results. In the case of an extension of the dimension relating to a current, the matrix $B_j$ 312 would be extended as well. The matrices A 313 and $B_j$ 312 form a second switching table, which is made available to the scheduler 323 as first switching table asynchronously with respect to the processes in the real-time part. Therefore, the optimization algorithm need not be real-time-enabled, which advantageously conserves resources. In the real-time part 320, a machine regulation 321 can optionally be arranged, which receives as input from a respective sensor, for example, measurement variables concerning a rotational speed of a connected electric machine 304 or concerning individual phase currents 305. If the multi-level converter is used as an AC voltage power supply system device, then a power supply system frequency is involved instead of a rotational speed 304. The machine regulation 321 continuously compares an actual value of the respective variable with a setpoint value and applies to the modulator 322 a voltage requirement ($v^*_a$, $v^*_b$, $v^*_c$) 324 corresponding to a respective difference, separately for each phase section a, b, c. The modulator 322 carries out a switching modulation, which can be realized e.g. by means of a pulse width modulation PWM or a sigma-delta modulation or a nearest-level modulation or a pulse density modulation or a spectral regulation or any other conceivable modulation, and communicates the quantized voltage levels ($I_a$, $I_b$, $I_c$) 325 resulting therefrom to the scheduler 323 as output voltages to be represented. Finally, in the first switching table for the voltage levels respectively communicated, the scheduler determines a respective set ($S_a$, $S_b$, $S_c$) 306 of module switching states and sends it to the multi-level converter for implementation.

Figure 4:
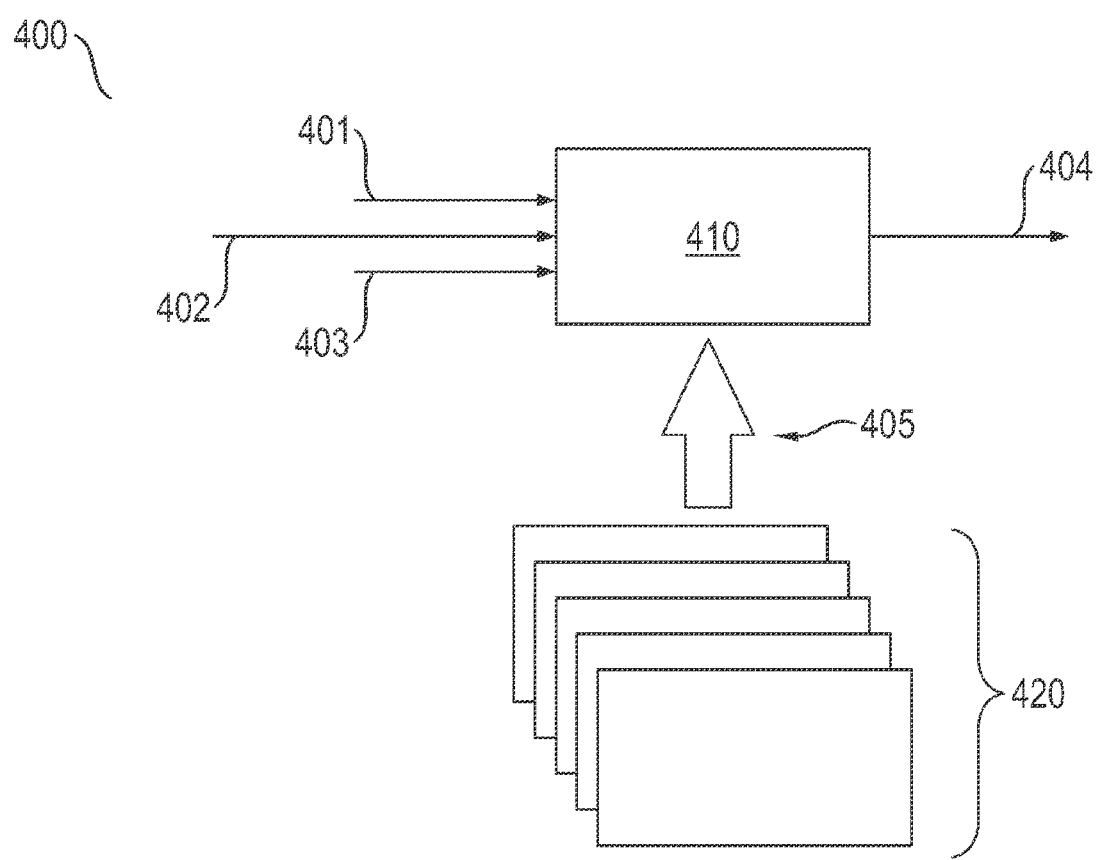
FIG. 4 schematically shows, in one embodiment of the method according to the invention, a block diagram concerning input and output variables of a scheduler.

FIG. 4 schematically shows, in one embodiment of the method according to the invention, a block diagram 400 concerning input variables 401, 402, 403, 420 and a total switching state 404 to be implemented by the multi-level converter as output variable of a scheduler 410. As input variables 401, 402, 403, 420, the scheduler 410 is provided with e.g. a new voltage requirement 401, which was quantized to a voltage level representable by the modules of the multi-level converter, and/or a current requirement 402. Moreover, a total switching state 403 realized previously in a switching step is input. In a pure reading process 405, the scheduler consults a first switching table 420, in which the associated module switching states are stored for the voltage level respectively desired. For better optimization results or adaptation to the present total switching state, further dimensions optimized e.g. for different current amplitudes and/or current direction can be added to the first switching table 420. Furthermore, a choice of the best nearest total switching state for a given voltage requirement can also be related to the last total switching state 403 present, since it is advantageous, for example, proceeding from this last total switching state 403 present, in order to avoid switching losses, to change module switching states as little as possible so as to arrive at the new total switching state 404. Accordingly, the first switching table is extended by further dimensions. One of these dimensions may be given e.g. by a respective current for which specific module switching states are switched, e.g. for a current of 0 A with output state "all module switching states to bypass", for a current of 0 A with output state "all module switching states to bypass, apart from the module at a respective phase section end, which is connected serially," or else for a current of 500 A with an output state "all module switching states to serial interconnection", etc. In principle, the dimensioning of the first switching table can be extended for all conceivable constraints as long as this is permitted by an available computation time and/or memory space.

Figure 5:
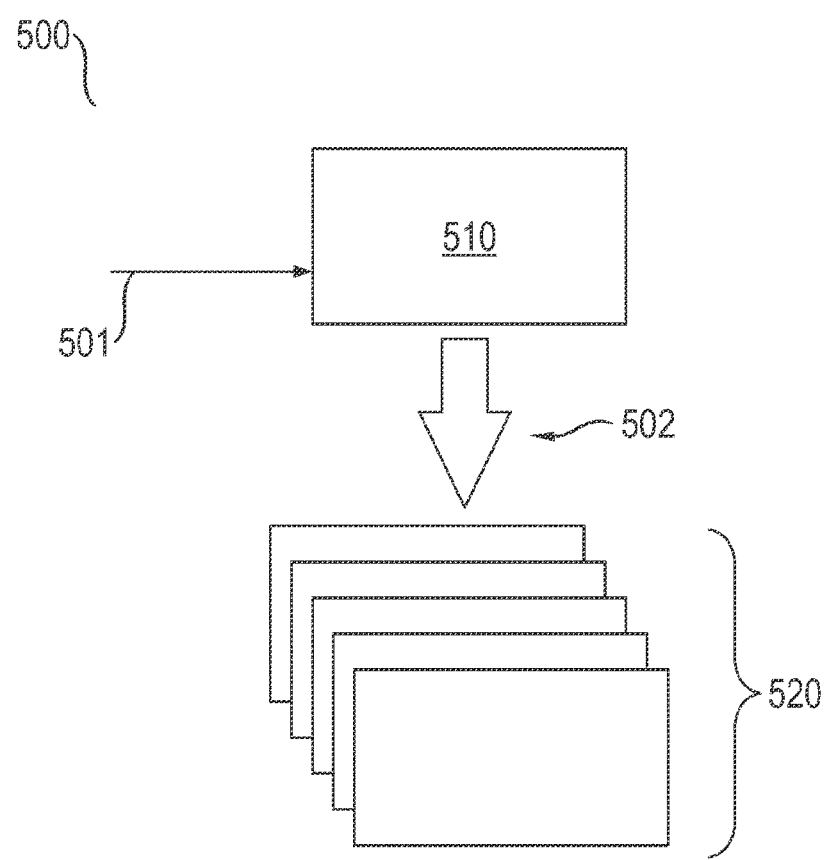
FIG. 5 schematically shows, in one embodiment of the method according to the invention, a block diagram concerning an optimizer.

FIG. 5 schematically shows, in one embodiment of the method according to the invention, a block diagram 500 concerning an optimizer 510. The optimizer 510 calculates, for a plurality of current steps, all voltage steps generatable by module switching states and bears a main computational load in the process. However, since it is implemented in terms of hardware technology on a dedicated computing unit, it does not adversely affect the implementation of the scheduler, which operates on the basis of the (first) switching table present until it receives from the optimizer 510 the newly calculated (second) switching table 520 thereof. The optimizer 510 seeks module switching states that are optimized in accordance with the cost function for each total switching state and records them by means of a storage process 502 in the second switching table 520. The total switching state can advantageously be defined by as many measurement variables as possible, with only the available computation time and/or the memory space forming a limitation. The measurement variables form an input 501 to the optimizer 510, and are taken from the following list, for example: state of charge, error states, physical differences between modules, degree of modulation, phase angle cos ϕ, electrical frequency, leakage currents and/or other current withdrawals from individual modules.

Figure 6:
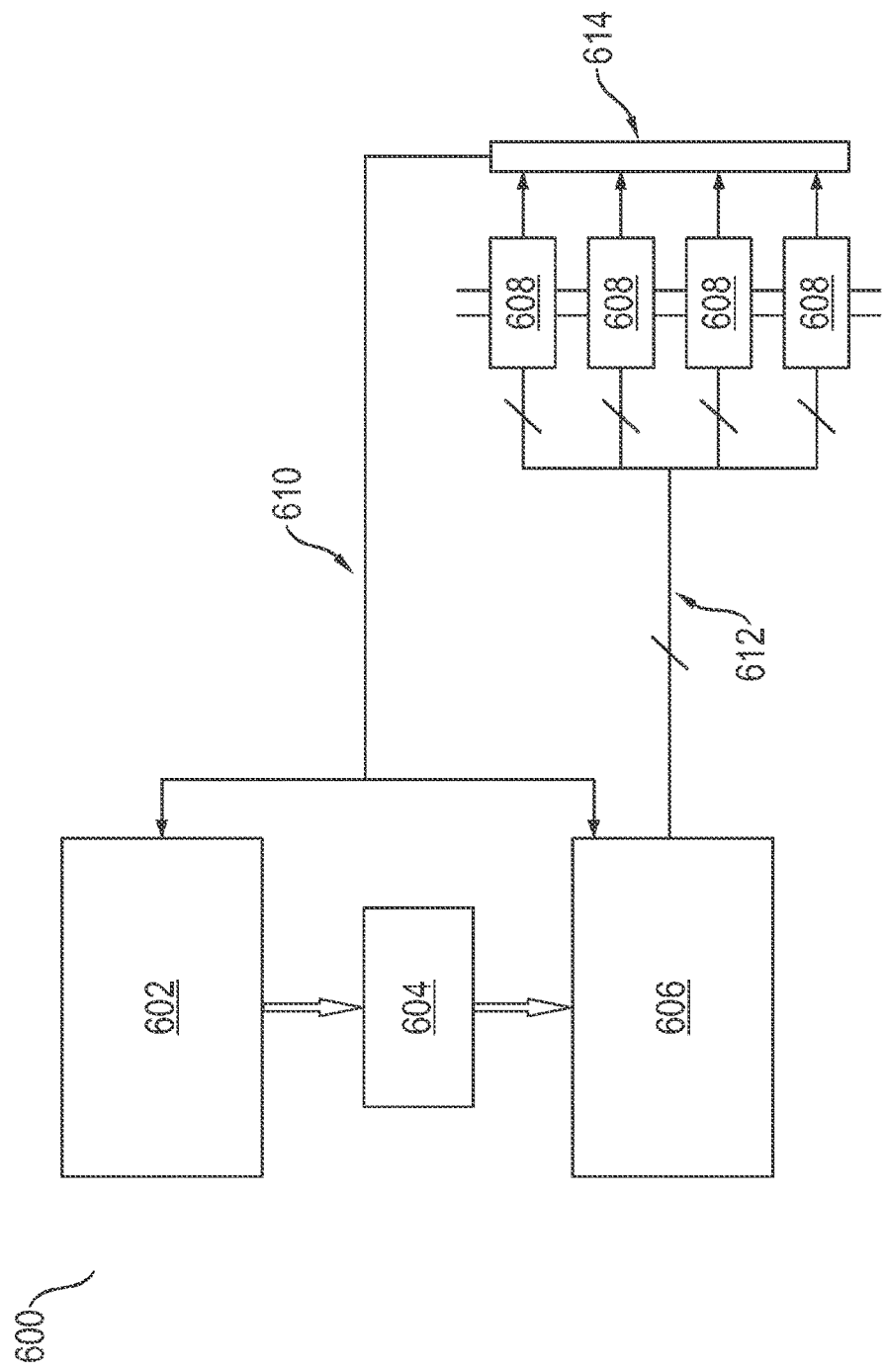
FIG. 6 schematically shows, in one configuration of the system according to the invention, a physical set-up of the hardware.

FIG. 6 schematically shows, in one configuration of the system according to the invention, a physical set-up 600 of the hardware, this set-up illustrating the division into two physically separate computing units. The offline part 602 with the optimizer is implemented on a microcontroller or a microprocessor or a digital signal processor (DSP) or an ALU-based computation architecture or a combination thereof. The real-time part 606 having at least one modulator and a scheduler is implemented on a logic circuit, which may optionally be programmable, e.g. FPGA (field programmable gate array) or CPLD (complex programmable logic device) or gate arrays or PLA (programmable logic array). Both offline part 602 and real-time part 606 access a common memory 604 containing the first and second switching tables, wherein the access by the offline part 602 is effected in a writing manner, and the access by the real-time part 606 in a reading manner. If the first and second switching tables have larger dimensions, a dynamic memory can be involved here. As an alternative thereto, particularly in the case of first and second switching tables with smaller dimensions, a fast static memory, e.g. a flip-flop-based memory or a vector register, can be involved. A communication 612 of the respective module switching states for the next switching step to the multi-level converter is effected via a control bus. At least one respective current sensor 614 is arranged at the respective modules 608 of the multi-level converter. Optionally, even further sensors such as e.g. a respective temperature sensor or a respective module voltage sensor can be arranged at the respective modules 608. The respective sensors 614 communicate their measurement variables 610 as sensor signals (either as individual signals or in a manner collected via a bus, e.g. a physical return channel of a control bus) respectively to the offline part 602 and the real-time part 606.

Figure 7:
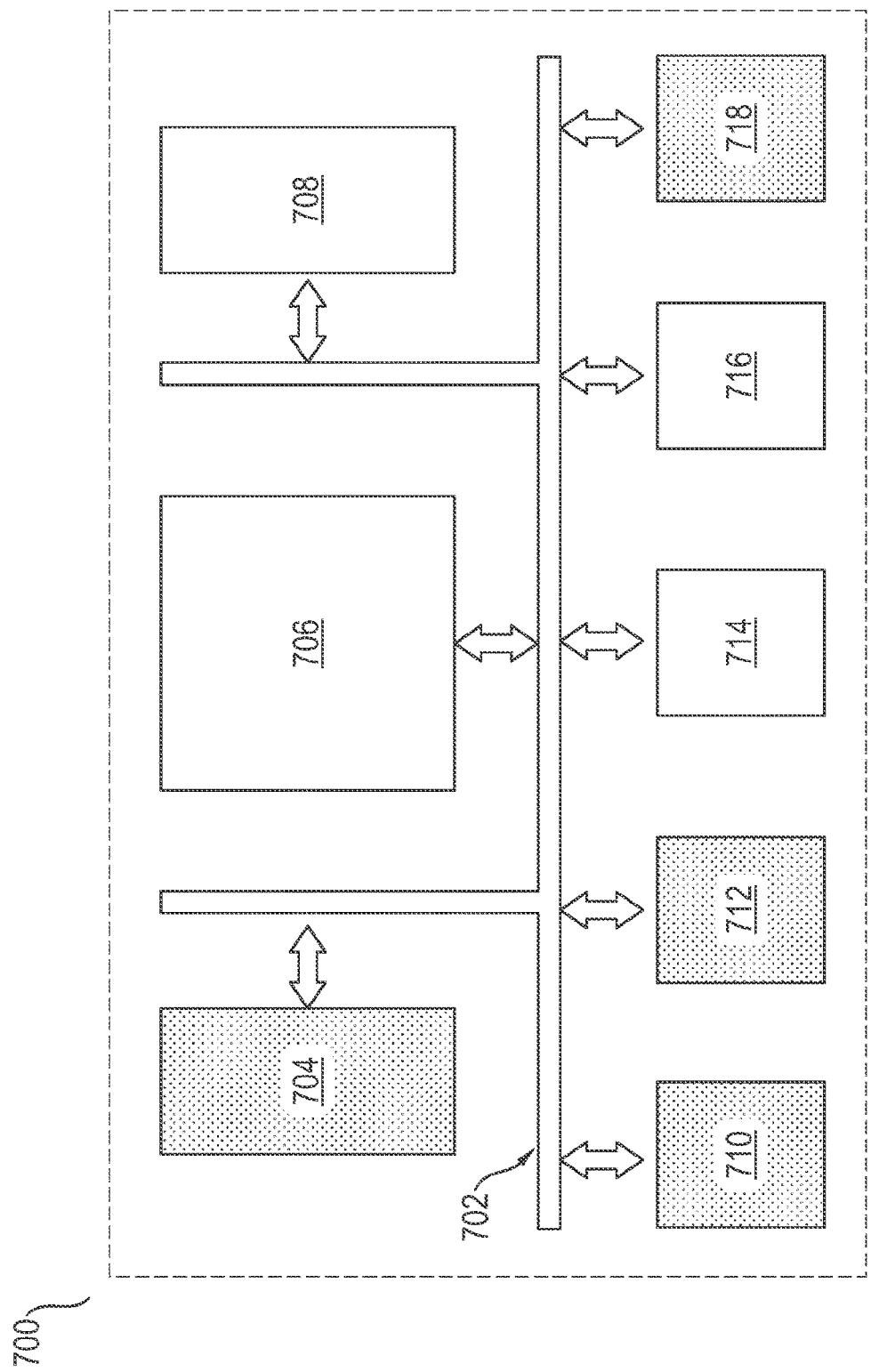
FIG. 7 schematically shows, in a further configuration of the system according to the invention, a division into units of a digital signal processor.

FIG. 7 schematically shows, in a further configuration of the system according to the invention, a division into units of a digital signal processor (DSP) 700. The DSP 700 comprises at least one CPU core 706, a RAM memory 704, a Flash memory 708, a peripheral bus controller 710, e.g. SPI of the I²C, a GPIO multiplexer 712, a DMA controller 714, a hardware PI controller 716 and a scheduler 718. A communication between these units takes place via a memory bus 702. The optimization algorithm that carries out the method according to the invention and the switching controller are implemented on a common digital signal processor 700 without further logic such as a field programmable gate array (FPGA), complex programmable logic device (CPLD) or the like. In this case, the scheduler runs as a customary sequential process on the signal processor 700 with fixed, real-time-enabled scheduling, i.e. with guaranteed maximum delays and guaranteed maximum deadlines, such that a predefined minimum rate or reaction time, e.g. of a power supply system regulation or machine regulation, is complied with. The power supply system or machine regulation and the scheduler can be called up e.g. by way of a respective interrupt. In parallel therewith the optimization runs as a further process or thread almost independently with a significantly longer deadline or no deadline at all. On account of the first switching table being accessed by the scheduler only in a reading manner, the optimization algorithm accessing said first switching table for a short time in a writing or copying manner, a largely causal separation of both processes or threads can be achieved. One and the same processor optionally having a plurality of cores, can implement the optimization algorithm in pauses of the scheduler or of other processes acting on the real-time part, such as e.g. the power supply system or machine regulation, without the scheduler or said other processes being adversely affected. The scheduler can be represented e.g. as pure input-value-dependent read-out of the correspondingly nearest module switching states from a memory and direct transfer to an I/O unit of the processor. The scheduling portion that remains after splitting off the optimization is manifested as relatively small and undemanding. What constitutes the main task is that whenever the modulator provides new input variables, the module switching state values of the individual modules that are associated with or closest to the input variables provided, e.g. a required voltage level or else in a simplified way merely an increase or reduction of the voltage by one step and e.g. a current direction, are taken from the memory 704, 708 with the first switching table and are transferred to an I/O unit in order to supply the modules with the module switching states respectively assigned to them directly or preferably via a bus. On account of the simplicity, the scheduler can be put into a dedicated hardware unit of the processor, which unit fulfils the scheduling tasks without the assistance of the CPU core 706. For this purpose, the dedicated unit must have access, by way of the internal processor bus 702, to the memory 704, 708 with the first switching table and to I/O units, e.g. GPIO 712, or peripheral bus units 710. The CPU core 706 can accordingly carry out the regulation, the modulation and the optimization.

Figure 8:
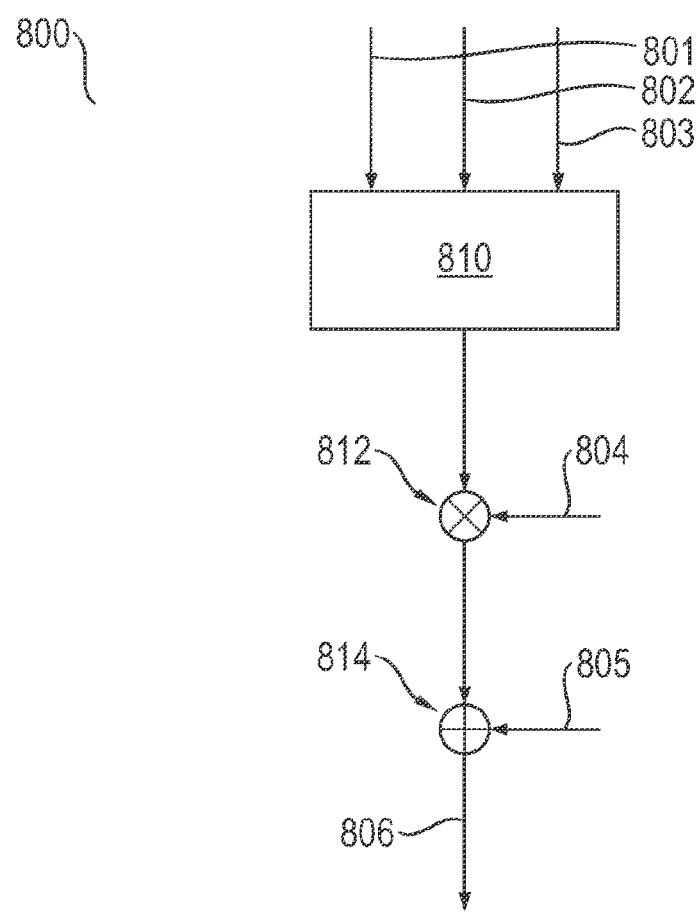
FIG. 8 schematically shows, in one embodiment of the method according to the invention, a sequence during address formation by means of a mapping of input variables to the scheduler onto a row of the first switching table.

FIG. 8 schematically shows, in one embodiment of the method according to the invention, a sequence 800 during address formation in which reference is made to a memory address of a memory area of the scheduler that encompasses total switching states by means of a mapping of input variables 801, 802, 803, wherein the module switching states and thus the total switching state are intended to be optimized depending on the input variables. A memory address formed by combination of the present total switching state and further input variables is not stored as such, but rather with its binary value already forms a reference to the memory address having the nearest total switching state. As first input variable 801, use can thus be made of e.g. the present total switching state as a bit combination, wherein the latter in combination with the further input variables 802 and 803 described by way of example below forms a memory address which is preferably listed in a sorted manner, i.e. in accordance with its binary magnitude. A second input variable 802 can be formed e.g. by a quantized voltage level provided by the modulator, wherein it carries a bit value "1" if the present voltage level is intended to be increased by one step, and has the bit value "0" if the present voltage level is intended to be decreased by one step. A third input variable 803 can be formed e.g. by a current direction required in the next switching step, wherein it carries a bit value "1" if the current direction runs from the first side to the second side of the module, and has the bit value "0" if the current direction runs from the second side to the first side of the module. However, the input variable 803 is also intended very generally to represent an arbitrary number of further input variables, preferably for rapidly changeable input variables. In a bit concatenation module 810, the three input variables are combined to form a concatenation of the bits. In the linking module 812, said concatenation is linked with a memory cell size, i.e. with the size (in the unit [bytes]) of memory space required to store an individual total system state, that is to say all module states of the multi-level converter. Finally, a start address of a beginning of a position of the first switching table within the memory is added in an addition module 814. The result 806 serves as a direct jump address in order to implement a nearest total switching state from the first switching table on the multi-level converter.

FIG. 9 schematically shows, in one embodiment of the method according to the invention, a sequence 900 during further address formation by means of the mapping of input variables 922, 802, 803 to the scheduler onto a row of the first switching table. In comparison with FIG. 8, the first input variable 922 is a quantized voltage requirement which is encoded as absolute or relative to the last voltage requirement by the modulator 920. The input to the modulator 920 is a non-quantized, e.g. continuous, voltage requirement 912 communicated e.g. by a power supply system or machine regulator 910. The use of a relative voltage requirement allows control over how many voltage steps there are between the present total switching state and the nearest total switching state. Owing to the enormous computational complexity of the optimization, here the amount of alternatives to be checked can also be reduced very efficiently already beforehand. In the case of fast switching modulation, usually only a small number of switching steps are required. Relatively large changes are required only for frequent abrupt voltage changes. Frequent, relatively large voltage steps furthermore generate increased switching losses since a plurality of modules must necessarily be switched, while a change by only one voltage level can be effected with only one or a small number of module state changes.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for control of switching states of a multi-level converter, the multi-level converter comprising a plurality of modules, each module of the plurality of modules comprising:
   at least one terminal on a first side and at least one terminal on a second side;
   at least two controllable switches; and
   at least one energy store,
   wherein in a first connection between the at least one terminal on the first side and the at least one terminal on the second side, the at least one energy store is arranged in series with a first of the at least two controllable switches, and
   wherein in a second connection between the at least one terminal on the first side and the at least one terminal on the second side, a second of the at least two controllable switches is arranged,
the control of the switching states being divided into a real-time part and an offline part, the method comprising:
   in the real-time part, for each time step:
      allocating a respective voltage level to a respective voltage requirement by a modulator;

determining a respective total switching state of all of the switches in a first switching table for the respective voltage level by a scheduler; and passing the respective total switching state on as a control signal to all of the switches, and in the offline part:

calculating a second switching table by an optimizer in a continuous succession, the second switching table resulting in accordance with a minimization of a cost function, wherein the cost function rates a total switching state, which is formed from predefined respective module switching states of the plurality of modules, at least with regard to uniform discharge of all energy stores of the multi-level converter, or minimum on-state losses, or minimum losses in the energy stores, or minimum total losses, wherein a present state of charge of all of the energy stores of the multi-level converter is provided continuously to the optimizer, wherein a row of the first switching table that has the module switching states to be implemented in the multi-level converter is accessed by a mapping of at least the voltage levels provided by the modulator, and wherein the row is used as an address referring to a content of a memory row in a memory of a computing unit that contains the switching table.

2. The method as claimed in claim 1, wherein the first switching table and the second switching tables differ from one another at a point in time, the method further comprising: after the conclusion of the calculation of the second switching table, replacing the first switching table with the calculated second switching table and using the calculated second switching table as the first switching table, and calculating a new second switching table by the optimizer.

3. The method as claimed in claim 1, wherein from a totality of all possible module switching states, the predefined module switching states are formed from those module switching states that can result from a parallel interconnection of all modules of the plurality of modules from a basic switching state.

4. The method as claimed in claim 1, wherein a number of modules of the plurality of modules are connected in series to form at least one phase section which forms a respective phase of an AC voltage.

5. The method as claimed in claim 2, the method comprising replacing the first switching table with the newly calculated second switching table after a predefined time period.

6. The method as claimed in claim 1, wherein a total cost function is formed from the cost function and at least one constraint by way of at least one state variable from the following:

current ripple, efficiency of the multi-level converter, aging of the energy stores of the multi-level converter, electromagnetic compatibility, distortion-free current/voltage profiles, module temperature of the respective modules, temperature development of the module, switching errors, on-state losses, fail-safety, targeted conservation of specific modules of the plurality of modules for maximizing fail-safety, compensation of identified weaknesses or different limits of individual modules of the plurality of modules, rotational speed of an electric machine driven by the multi-level converter, output frequency, power supply system frequency, or phase currents.

7. The method as claimed in claim 6, wherein for the respective state variable which influences the cost function or the respective at least one constraint and which changes only within a respective time frame specific to it, an associated term in the total cost function is calculated anew only after the respective time frame has elapsed.

8. The method as claimed claim 1, wherein upon detecting that a plurality of alternative total switching states of the multi-level converter are present, the scheduler makes a selection in accordance with a predetermined rule.

9. The method as claimed in claim 1, wherein in the real-time part, a machine regulator is arranged in the sequence upstream of the modulator and applies predefinitions to the modulator in accordance with the difference between an actual and a desired phase current of an electric machine connected to the multi-level converter.

10. The method as claimed in claim 1, wherein the modulator carries out at least one switching modulation in accordance with the following list: pulse width modulation generation, sigma-delta modulation, nearest-level modulation, pulse density modulation, spectral regulation.

11. A modular multi-level converter which comprises the system as claimed in claim 10, wherein a respective module, of the modules, comprises eight switches, wherein four half-bridges are respectively arranged from the eight switches, wherein in the respective module the first two half-bridges are interconnected in parallel with the at least two terminals on the first side, the second two half-bridges are interconnected in parallel with the at least two terminals on the right side, and there is an electrical connection between a respective low-side switch and a high-side switch of a respective half-bridge on the first side and on the second side of the respective module.

12. A system for control of a total switching state of a multi-level converter, the multi-level converter comprising a plurality of modules, each module of the plurality of the modules comprising:

at least one terminal on a first side and at least one terminal on a second side;

at least two controllable switches; and at least one energy store, wherein in a first connection between the at least one terminal on the first side and the at least one terminal on the second side, the at least one energy store is arranged in series with a first of the at least two controllable switches, and wherein in a second connection between the at least one terminal on the first side and the at least one terminal on the second side, a second of the at least two controllable switches is arranged, wherein the system is configured such that control of the total switching state is divided into a real-time module and an offline module, wherein the real-time module comprises at least one modulator and a scheduler, wherein the modulator is configured to allocate a respective voltage level to a respective voltage requirement for each time step, wherein the scheduler is configured to determine a respective total switching state of all switches in a first switching table for the respective voltage level and to pass on the respective total switching state as control signal to a controller of all of the switches, wherein the offline module comprises an optimizer, wherein the optimizer is configured to calculate a second switching table in a continuous succession by minimizing a cost function, wherein the cost function rates a total switching state, which is formed from predefined respective module switching states of the plurality of modules, with regard to uniform discharge of all energy stores of the multi-level converter, or minimum on-state losses, or minimum losses in the energy stores, or minimum total losses, wherein a present state of charge of all of the energy stores of the multi-level converter is configured to be provided continuously to the optimizer, and wherein the system is configured to access a row of the first switching table that has the module switching states to be implemented in the multi-level converter by a mapping of at least the voltage levels provided by the modulator, wherein the row includes an address referring to the content of a memory row in a memory of a computing unit that contains the switching table.

13. The system as claimed in claim 12, wherein the first switching table and second switching table are configured to differ from one another at a point in time, wherein after the conclusion of the calculation, the calculated second switching table replaces the first switching table, and from then on is to be used as the first switching table, and the optimizer is configured to begins the calculation of a new second switching table.

14. The system as claimed in claim 12, wherein from a totality of all possible module switching states, the predefined module switching states are formed from those module switching states which can result from a parallel interconnection of all modules of the plurality of modules from a basic switching state.

15. The system as claimed in claim 12, comprising at least one sensor, which is assigned to at least one state variable of an overall system, wherein the overall system comprises the multi-level converter, the controller of all switches of the multi-level converter, and an electronic consumer that taps off an output voltage of the multi-level converter, wherein a constraint for the cost function is formed by way of the at least one state variable by at least one measurement variable provided by the at least one sensor, wherein a total cost function results from the constraint together with the cost function, wherein the at least one state variable comprises:
current ripple, efficiency of the multi-level converter, ageing of the energy stores of the multi-level converter, electromagnetic compatibility, distortion-free current/voltage profiles, module temperature of the respective modules, switching errors, on-state losses, fail-safety, targeted conservation of specific modules of the plurality of modules for maximizing fail-safety, compensation of identified weaknesses or different limits of individual modules of the plurality of modules, rotational speed of an electric machine driven by the multi-level converter, output frequency, power supply system frequency, phase currents.

16. The system as claimed in claim 12, wherein the real-time module comprises a machine regulator configured to apply predefinitions to the modulator in accordance with a difference between an actual and a desired phase current of an electric machine connected to the multi-level converter.

* * * * *